United States Patent
Chen et al.

(10) Patent No.: US 7,490,321 B2
(45) Date of Patent: Feb. 10, 2009

(54) METHOD FOR UPDATING FIRMWARE VIA DETERMINING PROGRAM CODE

(75) Inventors: Ping-Sheng Chen, Chia-Yi Hsien (TW); Sung-Yang Wu, Tai-Chung Hsien (TW); Yen-Cheng Lin, Kao-Hsiung (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 474 days.

(21) Appl. No.: 10/904,378

(22) Filed: Nov. 7, 2004

(65) Prior Publication Data

US 2005/0144611 A1 Jun. 30, 2005

(30) Foreign Application Priority Data

Dec. 15, 2003 (TW) .............. 92135361 A (51) Int. Cl.
*G06F 9/44* (2006.01)
*G06F 9/00* (2006.01)

(52) U.S. Cl. .............. 717/168; 717/173; 717/177; 713/1; 713/2; 713/100

(58) Field of Classification Search ......... 717/168–178; 713/1, 2, 100
See application file for complete search history.

(56) References Cited

U.S. PATENT DOCUMENTS

| | | | | |
|---|---|---|---|---|
| 5,210,854 A | * | 5/1993 | Beaverton et al. | 717/174 |
| 5,566,335 A | * | 10/1996 | Nash et al. | 713/1 |
| 6,135,651 A | * | 10/2000 | Leinfelder et al. | 717/168 |
| 6,170,043 B1 | * | 1/2001 | Hu | 711/158 |
| 6,219,828 B1 | * | 4/2001 | Lee | 717/129 |
| 7,089,547 B2 | * | 8/2006 | Goodman et al. | 717/168 |
| 7,222,339 B2 | * | 5/2007 | Rothman et al. | 717/168 |
| 7,249,140 B1 | * | 7/2007 | Korenevsky et al. | 707/102 |
| 2003/0221046 A1 | * | 11/2003 | Lin et al. | 711/103 |
| 2004/0143828 A1 | * | 7/2004 | Liu et al. | 717/168 |
| 2004/0205386 A1 | * | 10/2004 | Staiger | 714/6 |
| 2006/0136900 A1 | * | 6/2006 | Kim et al. | 717/168 |

FOREIGN PATENT DOCUMENTS

JP 2000-163268 6/2000

OTHER PUBLICATIONS

Implementation of nonstop software update for client-server applications, Wen-Kang Wei; Kuo-Feng Ssu; Jiau, H.C., 2003, IEEE, pp. 391-397.*

(Continued)

*Primary Examiner*—Wei Y. Zhen
*Assistant Examiner*—Satish S. Rampuria
(74) *Attorney, Agent, or Firm*—Winston Hsu (57) ABSTRACT

A memory module of an electrical apparatus has a normal firmware section. A method for determining correctness of program code in the memory module includes making a value stored in at least one specific address match a first rule; providing a inspection instruction; and determining whether the value stored in at least one specific address matches the first rule or not according to the inspection instruction. The electrical apparatus executes the inspection instruction at power-on in order to determine correctness of the program code in the normal firmware section.

35 Claims, 5 Drawing Sheets

OTHER PUBLICATIONS

A technique for dynamic updating of Java software, Orso, A.; Rao, A.; Harrold, M.J., 2002, IEEE, pp. 649-658.*

Dynamically updating distributed software: supporting change in uncertain and mistrustful environments, Segal, M.E.; Frieder, IEEE, 1989, pp. 254-261.*

Implementation of nonstop software update for client-server applications, Wen-Kang Wei; Kuo-Feng Ssu; Jiau, H.C.; Computer Software and Applications Conference, 2003. COMPSAC 2003. Proceedings. 27th Annual International, Nov. 3-6, 2003 pp. 391-397, IEEE.*

Dynamic evolution of network management software by software hot-swapping☐☐Feng, N.; Ao, G.; White, T.; Pagurek, B., Integrated Network Management Proceedings, 2001 IEEE/IFIP International Symposium on, 2001, pp. 63-76, IEEE.*

A technique for dynamic updating of Java software, Orso, A.; Rao, A.; Harrold, M.J., Software Maintenance, 2002. Proceedings. International Conference on, 2002, pp. 649-658, IEEE.*

* cited by examiner

METHOD FOR UPDATING FIRMWARE VIA DETERMINING PROGRAM CODE

BACKGROUND OF INVENTION

1. Field of the Invention

The present invention relates to a method for determining the correctness of a program code stored in a memory module, and more particularly, to a method for determining the correctness of a program code stored in a memory module in an electronic device.

2. Description of the Prior Art

Microprocessors and memories play an important role in modern information-oriented society, and they are widely used in different electronic apparatuses. For example, in a DVD player, CD-ROM, CD-RW, DVD-ROM, there is a microprocessor that executes a program code stored in a non-volatile memory, such as a flash memory or a ROM, to process data stored in a volatile memory, such as a DRAM or an SRAM, in cooperation with an application specific integrated circuit (ASIC).

The microprocessor operates by executing the program code, which is stored in the non-volatile memory and is also called firmware. For reasons of enhancement, improvement and debugging, most firmware needs to be updated, which is known as a "firmware update" process.

A problem with firmware updates is that they may fail due to electric power failure or incorrect operation. Such kind of firmware update failure causes an extreme system failure to the point that further firmware updates cannot be executed anymore to restore the system. In order to prevent this condition in advance, boot code protection is applied in the prior art. Boot code is a part of the firmware program code that is a section of the program code initially executed whenever the system is powered on or rebooted. The boot code is stored in a boot code section of a non-volatile memory, and the remaining firmware program code is stored in a normal firmware section of the non-volatile memory. In general, the firmware update process updates the program segment stored in the normal firmware section and the boot code stored in the boot code section is not changed during firmware update.

If firmware update fails, the system can execute the boot code to reboot the system after it finishes a specific firmware determining procedure. In such a manner, even if the firmware update fails, the system can reboot again by executing the boot code and then re-perform the firmware update process.

However, one scheme of the firmware determining procedures of the prior art needs to determine the configurations of circuit pins while another scheme needs to pre-store a replica firmware program code in the non-volatile memory. In the later case, the firmware determining procedures of the prior art determine the correctness of the firmware program code by checking whether or not the checksum of the firmware program code equals to the checksum of the replica firmware program code.

As mentioned above, the firmware determining procedure of the prior art requires extra memory space to store the replica firmware program code, so that the cost of circuit is increased. In addition, since the firmware determining procedure of the prior art needs to calculate and compare the checksum of the firmware program code and the checksum of the replica firmware program code, the system performance may be affected. Furthermore, the reliability of the checksum comparison is not sufficiently accurate.

SUMMARY OF INVENTION

It is therefore an objective of the claimed invention to provide a method for determining the correctness of the firmware code stored in a memory module in an electronic device by checking whether the values stored in at least one specific address match a predefined rule.

According to a preferred embodiment, the present invention discloses a method for determining correctness of program code stored in a memory module having a normal firmware section in an electronic device, the method includes: setting values stored in at least one specific address according to a first rule; providing an inspection instruction; and checking the values stored in the specific addresses according to the inspection instruction; wherein the electronic device executes the inspection instruction to check the values stored in the specific addresses at power on; if the values stored in the specific addresses match the second rule, the program code stored in the normal firmware section has an error; and if the values stored in the specific addresses match the first rule, the program code stored in the normal firmware section is correct.

One advantage of the method of determining correctness of program code stored in the memory module of the present invention is that the electronic device does not require an extra memory space to store a replica firmware program code, so that the memory requirement and circuitry cost are reduced.

Another advantage of the method of determining correctness of program code stored in the memory module of the present invention is that the judging rule used for determining the correctness of the program code can be flexibly adjusted to improve the accuracy and efficiency of firmware determining procedure.

Another objective of the present invention is to provide a method for updating program code stored in a memory module having a normal firmware section in an electronic device. According to a preferred embodiment of the present invention, the method includes: setting values of at least one specific address according to a second rule; replacing a first program segment stored in the normal firmware section with a second program segment; and when updating a last program segment stored in the normal firmware section, setting the values stored in the specific addresses according to a first rule.

One advantage of the method of updating program code stored in the memory module of the present invention is that the electronic device can only set the values of the specific addresses while firmware update and not need to prepare a replica program code nor to rely on complex program updating procedures.

Yet another objective of the present invention is to provide a method for executing program code stored in a memory module having a normal firmware section in an electronic device. According to a preferred embodiment, the method includes: utilizing the electronic device to determine values stored in at least one specific address; if the values stored in the specific addresses match a second rule, utilizing the electronic device to execute program code stored in a boot code section and not the program code stored in the normal firmware section; and if the values stored in the specific addresses match a first rule, utilizing the electronic device to execute program code stored in the normal firmware section.

The method of executing program code stored in the memory module of the present invention is simple and fast due to the electronic device only needing to check the values of the specific addresses and not needing to calculate or compare the checksum of the firmware program code stored in the normal firmware section.

These and other objectives of the present invention will no doubt become obvious to those of ordinary skill in the art after reading the following detailed description of the preferred embodiment that is illustrated in the various figures and drawings.

DETAILED DESCRIPTION

In practical implementations, firmware program code can be stored in a memory module composed of at least one non-volatile memory. For convenience, the firmware program code is herein assumed as being stored in a single non-volatile memory. A person skilled in the art could also adopt a memory module composed of a plurality of non-volatile memory to achieve the same objective in accordance with the present invention.

Figure 1:
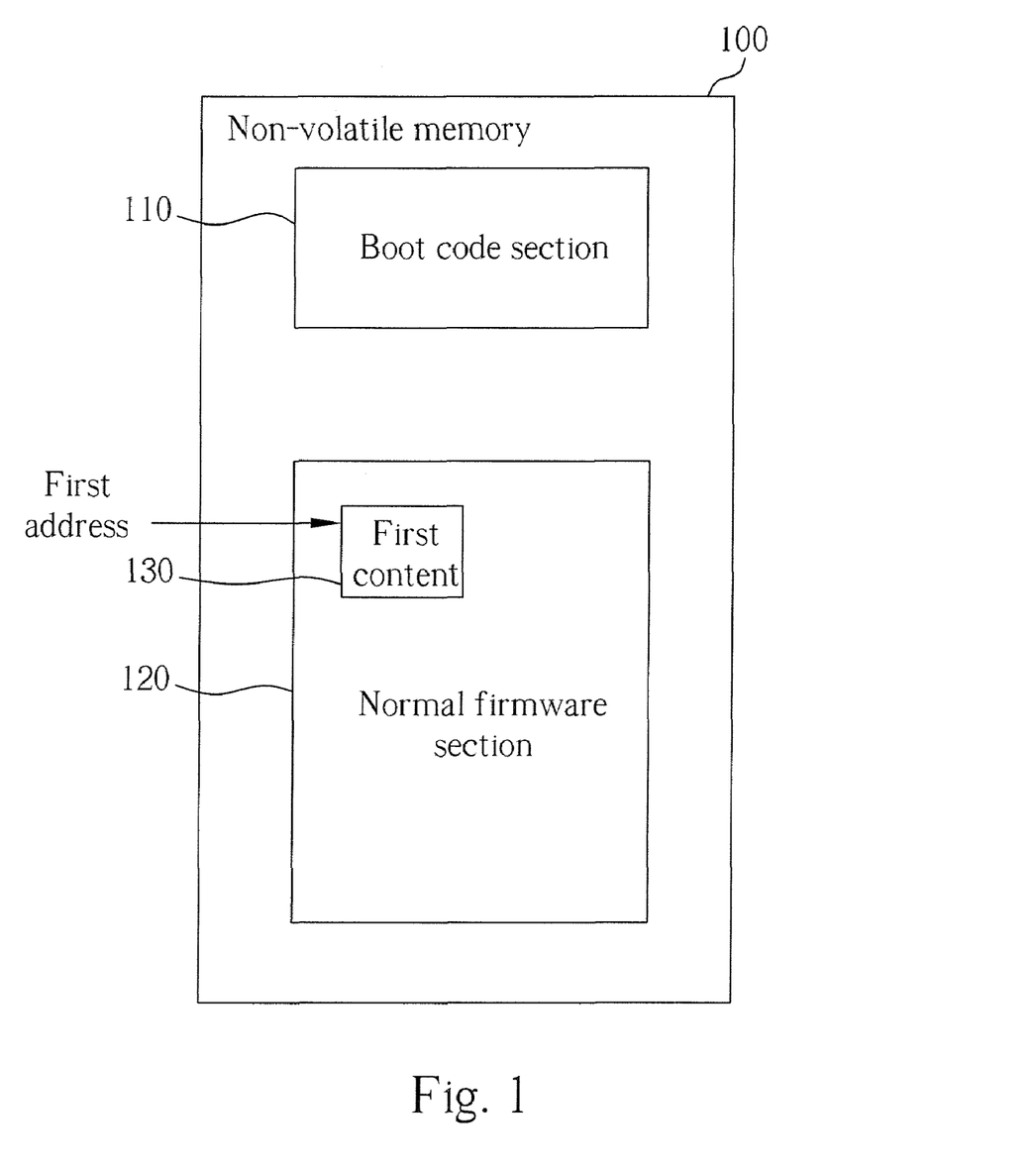
FIG. 1 is a schematic diagram of a non-volatile memory according to one embodiment of the present invention.

Please refer to FIG. 1, which depicts a block diagram of a non-volatile memory 100 for storing firmware program code according to the present invention. The non-volatile memory 100 comprises a boot code section 110 for storing a boot code, and a normal firmware section 120 for storing other firmware program code. The normal firmware section 120 comprises first content 130 located at a first address. The first address can be an arbitrary address of the normal firmware section 120. The length of the first content 130 is not limited. In practice, the first content 130 can be any length, for example, one bit. Obviously, the longer the first content 130 is, the more memory space of the normal firmware section 120 consumed. The method for determining the correctness of the firmware program code of the present invention will be discussed later. The following first illustrates the method for updating a firmware program code in an electronic device, such as a computer, an optical disk drive, an optical storage device, a VCD/DVD player, a digital camera, a printer, a scanner, other peripheral devices, or other electronic components having a firmware program code (e.g., digital signal processor, DSP) according to the present invention.

Figure 2:
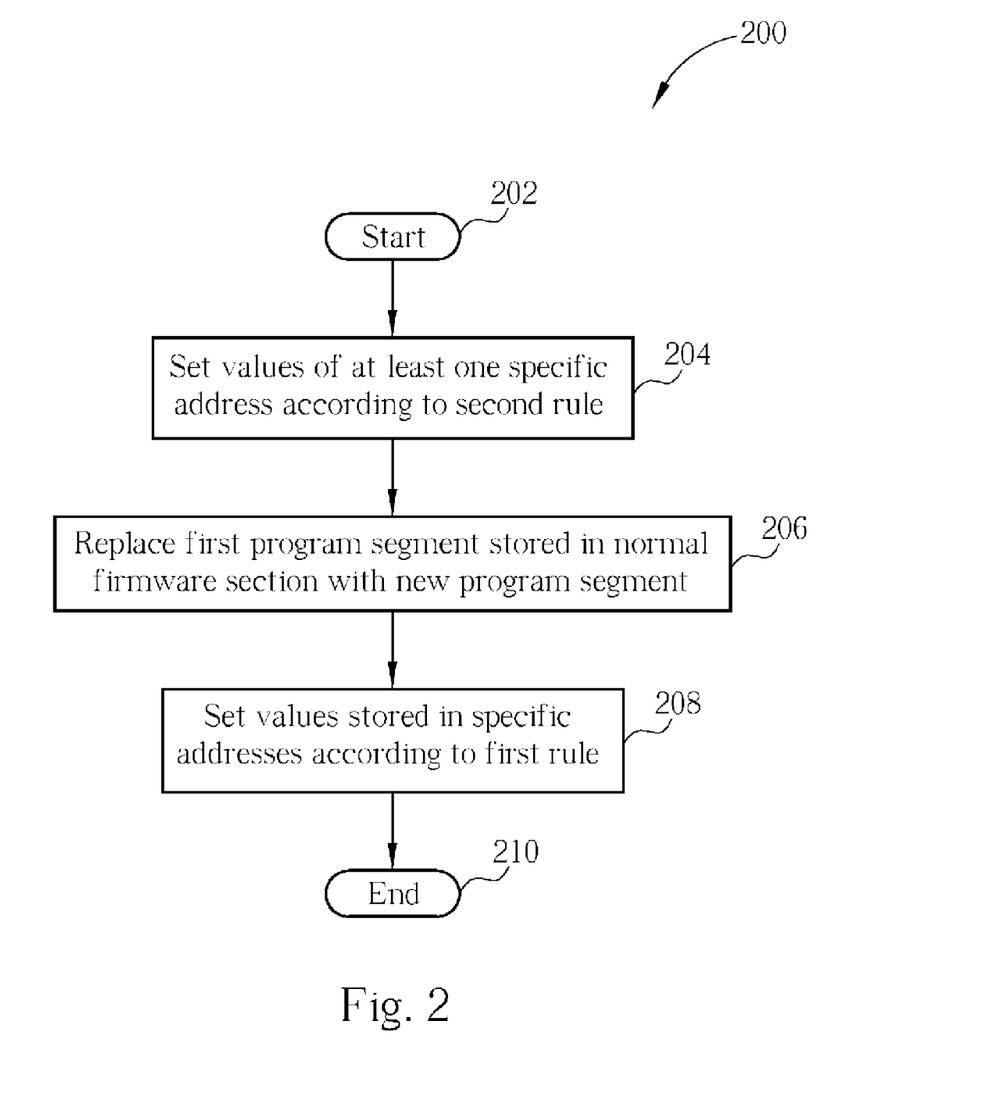
FIG. 2 is a flowchart of a method for updating firmware program code in an electronic device according to one embodiment of the present invention.

Please refer to FIG. 2, which depicts a flowchart 200 of a method for updating firmware program code in an electronic device according to one embodiment of the present invention. The flowchart comprises the following steps:

Step 202: Start. An electronic device prepares to replace a first program segment Program_X stored in the normal firmware section with a new program segment.

Step 204: Set values of at least one specific address according to a second rule.

Step 206: Replace the first program segment Program_X stored in the normal firmware section with the new program segment.

Step 208: Set the values stored in the specific addresses according to a first rule.

Step 210: End. The firmware update process of the electronic device is finished.

The first rule of step 208 is herein assumed to be that the first content 130 located at the first address of the normal firmware section 120 is a predetermined value, e.g., 01; and the second rule of step 204 is herein assumed to be that the first content 130 is a value other than the predetermined value ("01"), e.g., "02", "03", "FF", etc.

Before the electronic device replaces the first program segment Program_X stored in the normal firmware section 120 with a second program segment Program_A, the first content 130 can be any value including a value matching the first rule, i.e., "01". In a preferred embodiment, the initial value of the first content 130 is the value matching the first rule, i.e., "01", before the first program segment Program_X is replaced by the second program segment Program_A.

In step 204, the electronic device clears the first content 130 stored in the first address before replacing the first program segment Program_X with the second program segment Program_A. As a result, the changed first content 130 matches the second rule. In another embodiment, the electronic device can write a value other than the predetermined value ("01"), e.g., "AA", into the first address in step 204, so that the changed first content 130 also matches the second rule.

In step 206, the electronic device then replaces the first program segment Program_X with the second program segment Program_A to update the program code of the normal firmware section 120.

After step 206 is finished, the electronic device writes "01" into the first address of the normal firmware section 120, so that the first content 130 is changed to match the first rule.

In other words, at the beginning of the firmware update process of the present invention, the original first content 130, which matching the first rule, is changed to match the second rule, i.e., the value stored in the first content 130, "01", is changed to a value other than "01" (e.g., "FF" or "AA"). In the last step of the firmware update process of the present invention, the value stored in the first content 130 is changed back to "01", so that the first content 130 matches the first rule when the firmware update process is done.

As in the above illustration of the flowchart 200 mentioned above, it is known that the first content 130 located at the first address of the normal firmware section 120 is employed to provide a function for recording an updating state. Therefore the value stored in the first content 130 can be used to determine whether the firmware update process is successful.

Suppose that the firmware update fails due to any kind of problem; the electronic device can quickly determine whether the firmware program code stored in the normal firmware section 120 is updated successfully by checking if the first content 130 of the normal firmware section 120 matches the first rule after reboot. If the first content 130 does not match the first rule (or if it matches the second rule), i.e., the value of the first content 130 is "FF", "AA", or an arbitrary value other than "01", this indicates that the firmware update process for the normal firmware section 120 failed. Therefore, the electronic device determines that the program code stored in the normal firmware section 120 may be incorrect. On the other hand, if the first content 130 matches the first rule, i.e., if the value of the first content 130 is "01", the electronic device determines that the program code stored in the normal firmware section 120 is correct.

Once the electronic device determines that the program code stored in the normal firmware section 120 may be incorrect, the electronic device only executes the program code stored in the boot code section 110, i.e., the boot code, to initialize the system but not execute the program code stored in the normal firmware section 120 in order to avoid causing device malfunction or a worse situation. Therefore, the electronic device can re-perform steps 204 through 208 to update the firmware again.

Note that, in general, the new program segment for replacing the original firmware program segment (i.e., the second program segment Program_A) is temporarily stored in a buffer memory (such as a DRAM) and is then written to the normal firmware section 120 of the non-volatile memory 100 to replace the first program segment Program_X.

Thus, in practical implementations, step 208 can be performed after the electronic device writes the second program segment Program_A stored in the buffer memory into the non-volatile memory 100. In another embodiment, the value "01" corresponding to the first address is stored in the buffer memory first and is then loaded into the non-volatile memory 100 together with the second program segment Program_A. In this situation, steps 208 and 206 of the flowchart 200 can be regarded as being performed simultaneously.

Moreover, in another embodiment, the value "01" to be written into the first address is appended to a proper location of the source code of the new program segment Program_A, Source_A. For example, the value "01" can be appended to the end of the source code Source_A. The source code Source_A with the value "01" is compiled as a third program segment Program_A1. As a result, when the electronic device loads the third program segment Program_A1 into the non-volatile memory 100, the value of the first content 130 of the normal firmware section 120 is simultaneously changed to "01" to match the first rule. Therefore, the electronic device does not need to perform an additional writing step to write the value "01" into the first address to change the first content 130.

As mentioned above, the electronic device clears the first content 130 stored in the first address in step 204, so that the first content 130 is changed to "FF" to match the second rule. In another embodiment, the electronic device writes a specific value other than "01," e.g., "AA," into the first address to change the first content 130 to "AA" in order to match the second rule.

In addition, suppose that the electronic device changes the first content 130 to match the second rule by writing a specific value, e.g., "AA" into the first address. In this case, the electronic device can change a value in the buffer memory that is to be written into the first address to "AA" before the second program segment Program_A temporarily stored in the buffer memory is loaded into the normal firmware section 120. Therefore, steps 204 and 206 can be combined as a single step, i.e., the specific value "AA" can be loaded into the normal firmware section 120 together with the second program segment Program_A.

Similarly, in another embodiment of the present invention, the specific value "AA" is appended to a proper location of the source code Source_A, e.g., the front end of the source code Source_A. The source code Source_A with the specific value "AA" is compiled into a fourth program segment Program_A2. When the electronic device loads the fourth program segment Program_A2 into the normal firmware section 120, the first content 130 is simultaneously changed to match the second rule. In this embodiment, steps 204 and 206 are combined as a single step.

In another embodiment, the specific value "AA" is appended to the front end of the source code Source_A, and the predetermined value "01" is appended to the end of the source code Source_A. The source code Source_A, with both the specific value "AA" and the predetermined value, "01" is compiled into a fifth program segment Program_A3. As a result, while the electronic device replaces the first program segment Program_X with the fifth program segment Program_A3, the first content 130 stored in the first address of the normal firmware section 120 is first changed from the value matching the first rule, "01," to the specific value matching the second rule, "AA," and is finally changed from "AA" to "01"0 when the first program segment Program_X is replaced with the fifth program segment Program_A3.

Accordingly, when the electronic device finishes the firmware update process according to the present invention, the first content 130 of the normal firmware section 120 is the value "01", which matches the first rule.

As mentioned above, in practical implementations, the value of the first content 130 can be set by the electronic device before (or after) an updating program segment (such as the program segments Program_A, Program_A1 or Program_A2) is loaded into the normal firmware section 120, or by an updating program segment (such as the program segments Program_A1, Program_A2 or Program_A3). In other words, if at least one address of the normal firmware section 120 is employed to record any specific values or variables related to the firmware updating state during the firmware update process, this is also an embodiment of the present invention.

Note that, the present invention is not necessarily limited to using only a single specific address of the normal firmware section 120 to represent the firmware updating state. In fact, the method for updating firmware of the present invention can also set data (of equal or different lengths) stored in two or more than two specific addresses to provide associated information about the firmware updating state. Of course, the first rule and the second rule should be adjusted in this situation.

Figure 3:
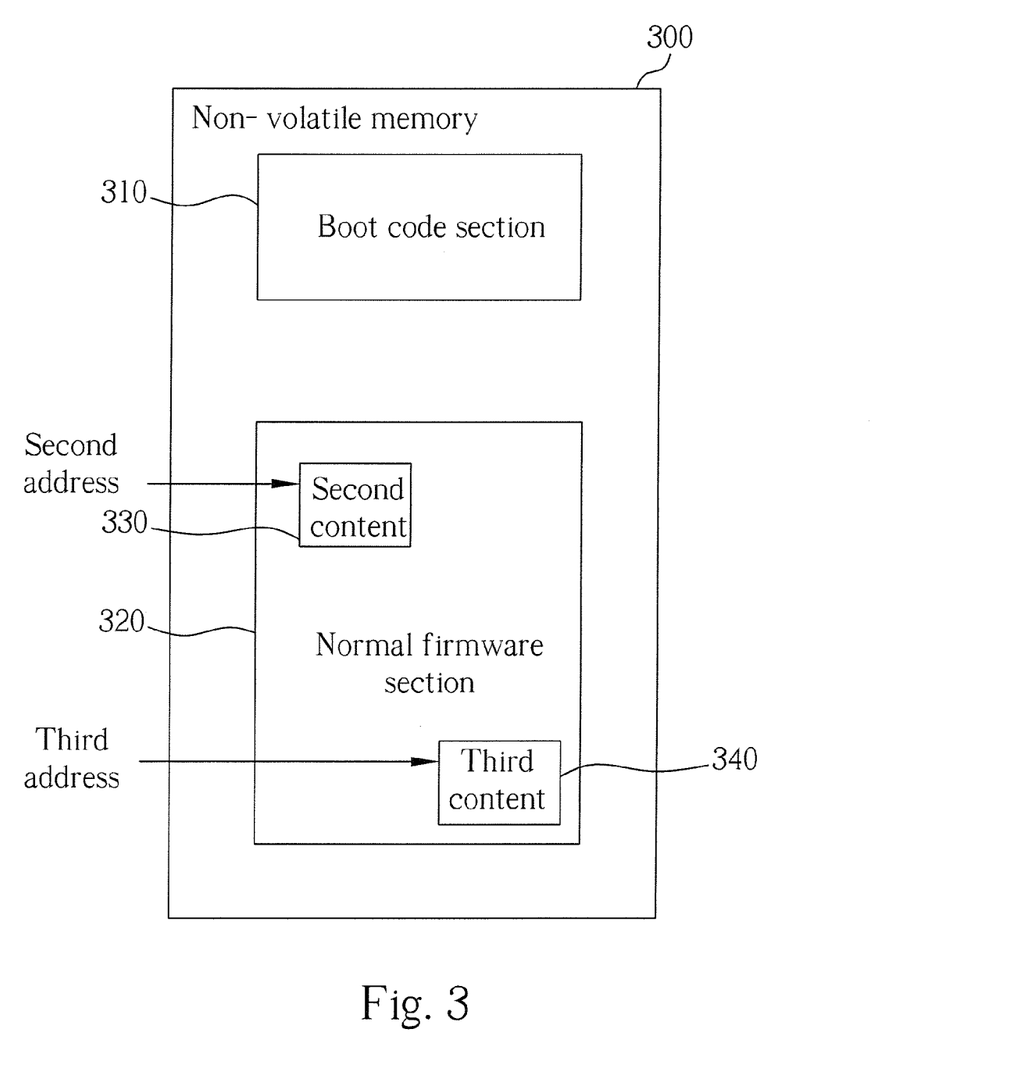
FIG. 3 is a schematic diagram of a non-volatile memory according to another embodiment of the present invention.

Please refer to FIG. 3, which depicts a block diagram of a non-volatile memory 300 according to another embodiment of the present invention. The non-volatile memory 300 comprises a boot code section 310 for storing a boot code, and a normal firmware section 320 for storing other firmware program code. The normal firmware section 320 comprises a second content 330 stored in a second address and a third content 340 stored in a third address. The second and third addresses can be arbitrary addresses of the normal firmware section 320. Additionally, the length of the second content 330 and the third content 340 can be equal or different. In different situations, the first rule and the second rule need to be adjusted appropriately.

In one embodiment of the present invention, the first rule is that both the second content 330 and the third content 340 are a predetermined value, e.g., a value "01," and the second rule is that one of the second content 330 and the third content 340 is not the predetermined value. Under this setting, the second rule is satisfied if both of the second content 330 and the third content 340 are changed to a second value, e.g., a value "BB," or if only one of them is changed to the second value "BB." In addition, if only one of the second content 330 and the third content 340 is changed to the second value "BB" and the other is changed to a third value "CC," the second rule is also satisfied.

In another embodiment of the present invention, the first rule is that the second content 330 and the third content 340 are the same, e.g., both of them are a value "11" or "22," and the second rule is that the second content 330 and the third content 340 are different, e.g., the second content 330 is "11" and the third content 340 is "22." Obviously, under this setting, if both of the second content 330 and the third content 340 are changed to the second value "BB," the first rule is satisfied but the second rule is not.

Note that, the setting of the first rule and the second rule of the present invention are not limited to the above two embodiments. For example, in a method for updating firmware of the present invention, the first and the second rules can be set to specify the operating result of the second content 330 and the third content 340. Furthermore, in a preferred embodiment, only the first rule needs to be specified, while the second rule is simply set as a mutually exclusive condition of the first rule. In other words, all the situations other than the setting of the first rule are included in the second rule.

Since the firmware updating method applied in the non-volatile memory 300 is similar with the firmware updating method applied in the non-volatile memory 100, the flowchart 200 is employed again in the following to illustrate the firmware updating method applied in the non-volatile memory 300 according to the present invention.

As mentioned above, in the preferred embodiment of the present invention, the first rule specifies that both the second content 330 and the third content 340 are a predetermined value, and the second rule is a mutually exclusive condition of the first rule. In other words, the second rule specifies that at least one of the second content 330 and the third content 340 are not the predetermined value. The predetermined value can be any value, for convenience, it herein assumed as a value "01."

Before the electronic device replaces the first program segment Program_X stored in the normal firmware section 320 with a sixth program segment Program_B, the second content 330 stored in the second address and the third content 340 stored in the third address can be any combination including the combination matching the first rule. For convenience of explanation, both the second content 330 and the third content 340 are herein assumed as the value "01", which matches the first rule before the first program segment Program_X is replaced by the sixth program segment Program_B.

In step 204, the values of the second content 330 and the third content 340 are changed according to the second rule before the electronic device replaces the first program segment Program_X stored in the normal firmware section 320 with the sixth program segment Program_B. In practice, the electronic device can only change one of the second content 330 and the third content 340 to a value other than the value "01" or change both the second content 330 and the third content 340 to a value other than "01." The electronic device then performs step 206 to replace the first program segment Program_X with the sixth program segment Program_B.

When the first program segment Program_X is completely replaced by the sixth program segment Program_B, the electronic device performs step 208 to set both of the second content 330 and the third content 340 to the value "01" according to the first rule.

Similarly, in step 204, the electronic device can write a value other than "01" to the second address or the third address to change the values of the second content 330 and the third content 340 to match the second rule, but the present invention is not limited to this manner. In another embodiment, for example, the electronic device changes a value stored in the buffer memory that is to be written into the second address to "01," and the value is then loaded into the non-volatile memory 300 together with the sixth program segment Program_B.

In another embodiment, the method for updating firmware program code of the present invention appends a value other than "01" (e.g., "AA") to a proper location of the front end of the source code of the sixth program segment Program_B, Source_B, and compile the source code, Source_B with the value "AA" into a seventh program segment Program_B1. Thus, when the electronic device loads the seventh program segment Program_B1 into the normal firmware section 320, the second content 330 is simultaneously changed to "AA" which is matching the second rule. In this situation, steps 204 and 206 are combined to a single step.

Similarly, in step 208, the manner that the electronic device changes the second content 330 and the third content 340 to match the first rule is not limited to writing the value "01" to both the second address and the third address after the sixth program segment Program_B is loaded into the normal firmware section 320. In fact, the electronic device can change two values stored in the buffer memory that corresponds to the second and the third addresses to "01," and then loads the two values into the non-volatile memory 300 together with the sixth program segment Program_B. In other words, the second content 330 and the third content 340 match the second rule before the first program segment Program_X is replaced by the sixth program segment Program_B, and are changed to match the first rule after the first program segment Program_X is replaced by the sixth program segment Program_B.

In another embodiment, the electronic device clears the value stored in the third address in step 204, so that the third content 340 is changed to "FF." In this embodiment, the value "01" is appended to a proper location of the end of the source code Source_B of the sixth program segment Program_B. The Souce_B with the value "01" is compiled into an eighth program segment Program_B2. As a result, when the electronic device loads the eighth program segment Program_B2 into the normal firmware section 320, the third content 340 is simultaneously changed back to "01" to match the first rule.

Moreover, the second address and the third address can be the beginning and the last location of the normal firmware section 320, respectively, and are used for storing the version information of the first program segment Program_X stored in the normal firmware section 320. In this situation, the first rule of the method for updating firmware program code of the present invention can be set as that the values of the second content 330 and the third content 340 are a same value, which can be any value, and the second rule can be set as that the values of the second content 330 and the third content 340 are different. A firmware provider can append the version information of the source code Source_B to the beginning and the end of the source code Sorce_B, and then compile the source code Source_B with the appended version information into a ninth program segment Program_B3.

As a result, when updating firmware stored in the non-volatile memory 300, the electronic device only needs to replace the first program segment Program_X with the ninth program segment Program_B3.

As mention above, the method for updating firmware program code changes values stored in at least one specific addresses of the non-volatile memory during firmware update process. So that the values of the specific addresses are changed to match different rules during firmware update and after firmware update in order to provide reference information about the firmware updating state.

Note that, in the foregoing embodiments, the employed specific addresses are located in the normal firmware section 120 (or 320) of the non-volatile memory 100 (or 300), these are just examples for conveniently illustrating the firmware updating method of the present invention and are meant to limit the scope of the present invention. In practice, the information associated with the firmware updating state can be stored in one or more non-volatile memories (such as FLASH or EEPROM etc.) other than the non-volatile memory 100 (or 300) of the electronic device. In other words, all the specific addresses can be located in the additional non-volatile memory. Furthermore, the method of the present invention can also use part of the memory space within the normal firmware section 120 (or 320) of the non-volatile memory 100 (or 300) and part of the memory space of one or more non-volatile memories other than the non-volatile memory 100 (or 300) to record the reference information associated with the firmware updating state.

In contrast to the prior art, the advantage of the firmware updating method of the present invention is that the electronic device only needs to set the specific addresses during the firmware update process and does not need to store a replica program code for comparison nor to employ complex updating procedures.

Figure 4:
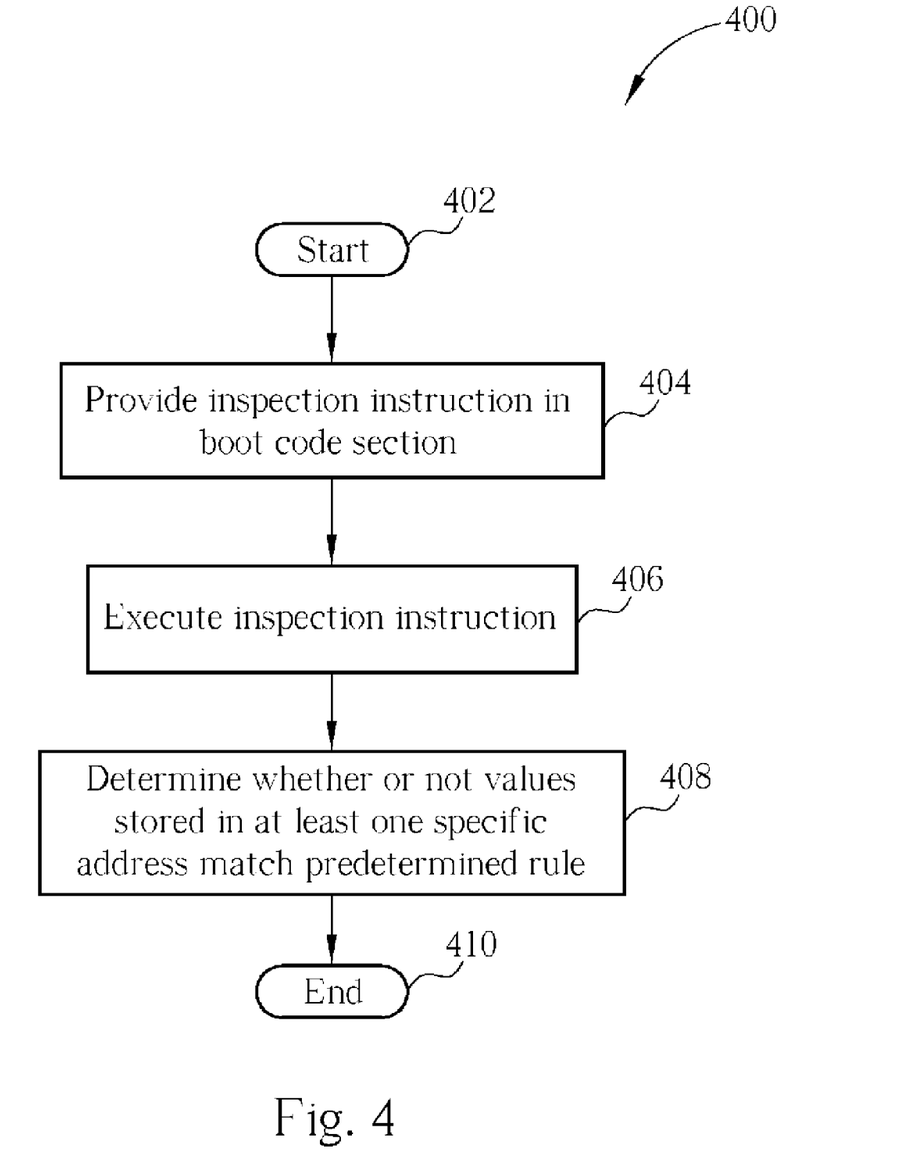
FIG. 4 is a flowchart of a method for determining the correctness of a firmware program code in an electronic device according to one embodiment of the present invention.

Please refer to FIG. 4, which depicts a flowchart 400 of a method for determining the correctness of a firmware program code in an electronic device according to one embodiment of the present invention. The flowchart 400 comprises the following steps:

Step 402: Start.

Step 404: Provide an inspection instruction in the boot code section.

Step 406: Utilize the electronic device to execute the inspection instruction.

Step 408: Determine whether or not the values stored in at least one specific address match a predetermined rule.

Step 410: End.

As mentioned above, in practical implementations, the firmware program code of the electronic device can be stored in a memory module composed of at least one non-volatile memory. In order to conveniently illustrate the flowchart 400, the firmware program code is herein assumed as being stored in the non-volatile memory 300. A person skilled in the art can utilize a memory module composed of a plurality of non-volatile memory to achieve the same objective in accordance with the present invention.

According to above-mentioned firmware updating method of the present invention, it is known that if the firmware update process fails, i.e., the firmware update process is not completely finished, part of the contents of the normal firmware section 320 is replaced by the new program segment while the other part of the contents of the normal firmware section 320 remains as the original contents of the first program segment Program_X. In this situation, the present invention is capable of determining whether the firmware update process is completely finished (also referred to as the correctness of the program code stored in the normal firmware section 320) by checking which of the first and second rules is matched by the second content 330 stored in the second address and the third content 340 stored in the third address of the normal firmware section 320.

Thus, in step 404, the firmware producer can provide an inspection instruction for determining the contents stored in the second address and the third address (i.e., the second content 330 and the third content 340) match a predetermined rule (e.g., the first rule) or another rule (e.g., the second rule). In a preferred embodiment, the second rule is simply set as the mutually exclusive condition of the first rule. In order to prevent the inspection instruction from being overwritten during the firmware update process, the inspection instruction is preferably stored in the boot code section.

In step 406, the electronic device executes the inspection instruction to check the values stored in the second address and the third address (i.e., the second content 330 and the third content 340) of the normal firmware section 320 at power on, reboot after firmware update fails, after firmware update is finished, or any other desired situations.

In step 408, the electronic device determines whether the second content 330 and the third content 340 match the first rule. If they match the first rule, the electronic device judges that the latest firmware update process was successful, i.e., the program code stored in the normal firmware section 320 is correct. On the other hand, if the second content 330 and the third content 340 match the second rule, the electronic device judges that the latest firmware update process was not completely finished, i.e., the program code stored in the normal firmware section 320 is incorrect.

As mentioned above, suppose that the electronic device only utilizes a single specific address, e.g., the first address of FIG. 1, to record the firmware updating state, the inspection instruction of the present invention only needs to check the value stored in the first address in step 404.

Therefore, the number of addresses and the contents of the addresses needing to be determined by the inspection instruction depending upon the firmware design and not limited to only a single address or two addresses as in the foregoing embodiments. In practice, the contents needing to be determined can also be stored in more than two addresses.

Note that, the information of the firmware updating state can be stored in one or more non-volatile memories (such as FLASH or EEPROM) other than the non-volatile memory 300. Moreover, part of the information of the firmware updating state can be stored in the normal firmware section 320 of the non-volatile memory 300 and the other part of the information of firmware updating state can be stored in one or more non-volatile memory (such as FLASH or EEPROM) other than the non-volatile memory 300. Therefore, the inspection instruction provided by the firmware producer in step 404 is adjustable depending on the firmware updating method thereof.

For example, suppose that the electronic device utilizes both addresses of the normal firmware section 320 of the non-volatile memory 300 and addresses of one or more non-volatile memory (such as FLASH or EEPROM) other than the non-volatile memory 300 to record the reference information associated with the firmware updating state during the firmware update process, the addresses needing to be determined by the inspection instruction comprises addresses of the non-volatile memory 300 and addresses of the additional non-volatile memory. Accordingly, in step 408, the electronic device executes the inspection instruction to determine whether the values stored in the specific addresses of the normal firmware section 320 and the additional non-volatile memory match the predetermined rule.

The method for determining the correctness of a firmware program code of the prior art needs to calculate the checksum of the firmware program code, the checksum of a replica firmware program code, and then compares the two checksums. It is obvious that the determining efficiency of the prior art is inversely proportional to the length of the firmware program code. In contrast to the prior art, the firmware determining method of the present invention is simpler and more efficient than the method of the prior art. As the size of the firmware program code increases, the required time to calculate the checksum of the prior art is also proportionally increased, so that the efficiency of the present invention becomes more and more superior to the prior art.

In addition, since the method for determining the correctness of the firmware program code of the present invention does not require extra memory space for storing a replica firmware program code, the memory space requirement and circuit cost are thereby reduced.

In general, the firmware determining process is not only performed after the firmware is updated, but is also performed at each time the electronic device starts in order to select the program code to be executed by the electronic device at that moment. Therefore, a method for executing a firmware program code in the electronic device at power on is disclosed in the present invention.

Figure 5:
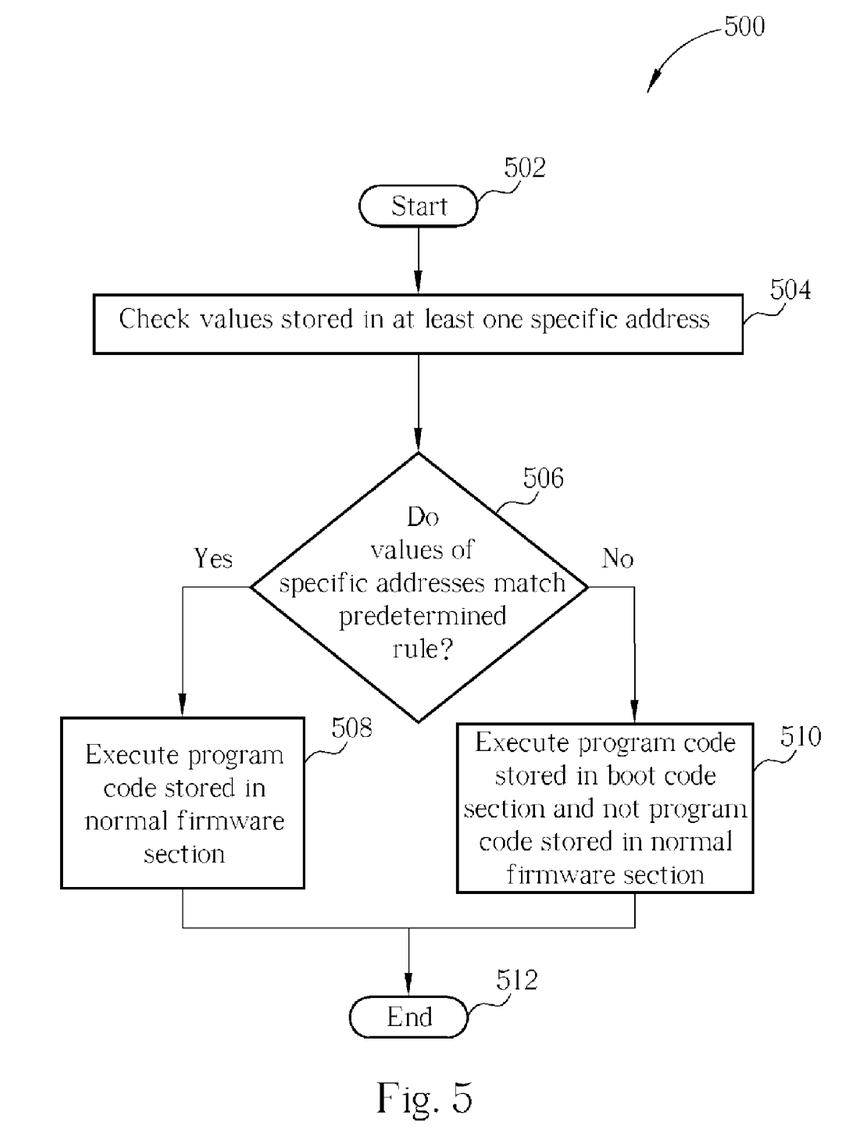
FIG. 5 is a flowchart of a method for executing firmware program code in an electronic device according to one embodiment of the present invention.

Please refer to FIG. 5, which depicts a flowchart 500 of a method for executing program code in the electronic device according to the present invention. The flowchart 500 comprises the following steps:

Step 502: Start.

Step 504: Check values stored in at least one specific address of a non-volatile memory.

Step 506: Determine whether the values stored in the specific addresses match a predetermined rule. If yes, perform step 508; otherwise, perform step 510.

Step 508: Utilize the electronic device to execute program code stored in a normal firmware section.

Step 510: Utilize the electronic device to execute program code stored in a boot code section and not the program code stored in the normal firmware section.

Step 512: End.

The concept of the method for executing the firmware program code in the electronic device is similar with the method for determining the correctness of the firmware program code mentioned above. In other words, the specific addresses can be located within a non-volatile memory module used for storing the firmware program code, or be located in one or more non-volatile memories (such as FLASH or EEPROM) other than the non-volatile memory module. Moreover, the specific addresses can also comprise part of the memory space of the normal firmware section of the non-volatile memory module and part of the memory space of the additional non-volatile memory. In order to conveniently illustrate the operation of the flowchart 500, the firmware program code is herein assumed to be stored in the non-volatile memory 300.

In step 504, the electronic device determines the values stored in the second address and the third address of the normal firmware section 320 at power on. In a preferred embodiment, the electronic device executes an inspection instruction stored in the boot code section 310 at power on, and then determines the values stored in the second address and the third address of the normal firmware section 320 according to the inspection instruction. As step 504 is similar with the above-mentioned step 406, for brevity, further details are omitted here. Similarly, the inspection instruction can be used for determining whether or not the value stored in a single address of the normal firmware section 320 matches a first rule. In practice, the number of addresses and the contents of the addresses needing to be determined by the inspection instruction depends upon the firmware design.

In step 506, the electronic device then determines whether both the second content 330 and the third content 340 match the first rule. If they match the first rule, the electronic device judges that the latest firmware update process is successful, i.e., the program code stored in the normal firmware section 320 is correct. In this situation, the electronic device then performs step 508. On the other hand, if the second content 330 and the third content 340 do not match the first rule, the electronic device judges that the latest firmware update process is not completely finished and that the program code stored in the normal firmware section 320 is incorrect. In this situation, the electronic device then performs step 510.

In step 508, since the electronic device concludes that the program code stored in the normal firmware section 320 is correct based on the determination of the inspection instruction, the electronic device can execute the program code stored in the normal firmware section 320 to initialize the system.

In step 510, since the electronic device concludes that the program code stored in the normal firmware section 320 is incorrect, the electronic device only executes the program code stored in the boot code section 310 to initialize the system and does not execute the program code stored in the normal firmware section 320. Therefore, in the method for executing the firmware program code of the present invention, the electronic device avoids executing incorrect program code stored in the normal firmware section 320, which would cause further damage. Another advantage of the present invention is that executing the boot code stored in the boot code section 310 can restart the electronic device, and the electronic device can then re-perform the firmware update process to correct the error of the program code stored in the normal firmware section 320.

In the prior art, an electronic device needs to calculate the checksums of its firmware program code and a replica firmware program code at power on. This not only affects the system performance, but could also damage the electronic device due to executing an incorrect firmware program code. In an even worse situation, the electronic device will be unable re-perform the firmware update process. In contrast to the prior art, it is obvious that the method of the present invention is simpler and faster due to the electronic device of the present invention only needing to determine the values of the specific addresses at power on and not needing to calculate and compare the checksums of the program code. Accordingly, the efficiency of the electronic device and the initialization procedure are thereby greatly improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for updating program code stored in a memory module having a normal firmware section in an electronic device, the method comprising:

before updating a first program segment stored in the memory module, setting values of at least one specific address according to a second rule;

replacing the first program segment stored in the normal firmware section with a second program segment; and after successfully updating the first program segment stored in the normal firmware section, setting the values stored in the specific addresses according to a first rule, wherein the second rule is a mutually exclusive condition of the first rule, the first rule represents that the normal firmware section has been updated successfully, the second rule represents that the normal firmware section has not been updated successfully, and the values stored in the specific addresses are employed to verify the correctness of updated program code in the normal firmware section.

2. The method of claim 1, wherein the first rule specifies that each of the values stored in the specific addresses is a first value.

3. The method of claim 1, wherein the first rule specifies that the values stored in the specific addresses are the same.

4. The method of claim 1, wherein the first rule specifies that a specific value is obtained when operating on the values stored in the specific addresses.

5. The method of claim 1, wherein the specific addresses comprise memory addresses of at least one non-volatile memory.

6. The method of claim 1, wherein the specific addresses comprise memory addresses of the normal firmware section.

7. The method of claim 1, wherein the specific addresses comprise memory addresses of the normal firmware section and memory addresses of at least one non-volatile memory other than the memory module.

8. The method of claim 1, wherein the electronic device is an optical disc drive.

9. A method for executing program code stored in a memory module having a normal firmware section in an electronic device, the method comprising:
  utilizing the electronic device to determine values stored in at least one specific address, wherein the values stored in the specific addresses are employed to verify the correctness of updated program code in the normal firmware section;
  if the values stored in the specific addresses match a second rule, utilizing the electronic device to execute program code stored in a boot code section and not to execute the program code stored in the normal firmware section; and
  if the values stored in the specific addresses match a first rule, utilizing the electronic device to execute program code stored in the normal firmware section,
  wherein the second rule is a mutually exclusive condition of the first rule, the values stored in the specific addresses matching the first rule indicates that the program code stored in the normal firmware section has been successfully updated, and the values stored in the specific addresses matching the second rule indicates that the program code stored in the normal firmware section has not been successfully updated.

10. The method of claim 9, further comprising utilizing the electronic device to execute an inspection instruction to check the values stored in the specific addresses.

11. The method of claim 10, wherein the inspection instruction is stored in the boot code section of the memory module.

12. The method of claim 9, wherein if the values stored in the specific addresses match the second rule, the program code stored in the normal firmware section has error.

13. The method of claim 9, wherein if the values stored in the specific addresses match the first rule, the program code stored in the normal firmware section is correct.

14. The method of claim 9, wherein the first rule specifies that each of the values stored in the specific addresses is a first value.

15. The method of claim 9, wherein the first rule specifies that the values stored in the specific addresses are the same.

16. The method of claim 9, wherein the first rule specifies that a specific value is obtained by operating on the values stored in the specific addresses.

17. The method of claim 9, wherein the specific addresses comprise memory addresses of at least one non-volatile memory.

18. The method of claim 9, wherein the specific addresses comprise memory addresses of the normal firmware section.

19. The method of claim 9, wherein the specific addresses comprise memory addresses of the normal firmware section and memory addresses of at least one non-volatile memory other than the memory module.

20. The method of claim 9, wherein the electronic device is an optical disc drive.

21. A method for determining correctness of program code stored in a memory module having a normal firmware section in an electronic device, the method comprising: providing an inspection instruction; and
  checking values stored in at least one specific address according to the inspection instruction, wherein the values stored in the specific addresses are employed to verify the correctness of updated program code in the normal firmware section;
  wherein the values stored in the specific addresses are set by a second rule before a firmware update process of the program code, and the values stored in the specific addresses are set by a first rule after the firmware update process of the program code is successfully performed, wherein the second rule is a mutually exclusive condition of the first rule, the values stored in the specific addresses matching the first rule indicates that the program code stored in the normal firmware section has been successfully updated, and the values stored in the specific addresses matching the second rule indicates that the program code stored in the normal firmware section has not been successfully updated; the electronic device executes the inspection instruction to check the values stored in the specific addresses at power on; if the values stored in the specific addresses match the second rule, the program code stored in the normal firmware section has an error; and if the values stored in the specific addresses match the first rule, the program code stored in the normal firmware section is correct.

22. The method of claim 21, further comprising storing the inspection instruction in a boot code section of the memory module.

23. The method of claim 21, further comprising:
  if the program code stored in the normal firmware section has error, the electronic device executes program code stored in a boot code section of the memory module and not the program code stored in the normal firmware section.

24. The method of claim 21, further comprising:
  if the program code stored in the normal firmware section is correct, the electronic device executes program code stored in the normal firmware section.

25. The method of claim 21, further comprising:
  while updating program code stored in the memory module, utilizing the electronic device to replace a first program segment stored in the normal firmware section with a second program segment.

26. The method of claim 25, wherein program code stored in a boot code section of the memory module is not changed while updating the program code stored in the memory module.

27. The method of claim 25, further comprising:
  setting the values stored in the specific addresses to match the second rule when beginning updating the program code stored in the memory module.

28. The method of claim 27, further comprising:
  setting the values stored in the specific addresses so that the values match the first rule when the program code stored in the memory module is updated.

29. The method of claim 21, wherein the first rule specifies that each of the values stored in the specific addresses is a first value.

30. The method of claim 21, wherein the first rule specifies that the values stored in the specific addresses are the same.

31. The method of claim 21, wherein the first rule specifies that a specific value is obtained when operating on the values stored in the specific addresses.

32. The method of claim 21, wherein the specific addresses comprise memory addresses of at least one non-volatile memory.

33. The method of claim 21, wherein the specific addresses comprise memory addresses of the normal firmware section.

34. The method of claim 21, wherein the specific addresses comprise memory addresses of the normal firmware section and memory addresses of at least one non-volatile memory other than the memory module.

35. The method of claim 21, wherein the electronic device is an optical disc drive.

* * * * *